US012685957B2

(12) United States Patent
Tsai et al.

(10) Patent No.: US 12,685,957 B2
(45) Date of Patent: Jul. 21, 2026

(54) SEMICONDUCTOR WASTE GAS TREATMENT SYSTEM AND MOISTURE-GAS SEPARATOR OF THE SAME

(71) Applicant: HIGHLIGHT TECH CORP., Tainan City (TW)

(72) Inventors: Ting Tsai, Tainan City (TW); Zhi-Hao Chen, Tainan City (TW); Shao-Qing Huang, Tainan City (TW)

(73) Assignee: HIGHLIGHT TECH CORP., Tainan City (TW)

( * ) Notice: Subject to any disclaimer, the term of this patent is extended or adjusted under 35 U.S.C. 154(b) by 427 days.

(21) Appl. No.: 18/512,714

(22) Filed: Nov. 17, 2023

(65) Prior Publication Data
US 2024/0198272 A1 Jun. 20, 2024

(30) Foreign Application Priority Data
Dec. 15, 2022 (TW) .................................. 111148234

(51) Int. Cl.
| | |
|---|---|
| *B01D 47/06* | (2006.01) |
| *B01D 46/10* | (2006.01) |
| *B01D 50/00* | (2022.01) |
| *B01D 53/75* | (2006.01) |
| *B01D 53/78* | (2006.01) |

(52) U.S. Cl.
CPC ............. *B01D 47/06* (2013.01); *B01D 46/10* (2013.01); *B01D 50/00* (2013.01); *B01D 53/75* (2013.01); *B01D 53/78* (2013.01); *B01D 2258/0216* (2013.01)

(58) Field of Classification Search
None
See application file for complete search history.

(56) References Cited

U.S. PATENT DOCUMENTS

| | | | | |
|---|---|---|---|---|
| 335,137 A | * | 2/1886 | Lillie | ...................... C10B 53/07 |
| | | | | 34/174 |
| 1,087,290 A | * | 2/1914 | Harker | ................... B01D 47/06 |
| | | | | 96/358 |

(Continued)

FOREIGN PATENT DOCUMENTS

| | | |
|---|---|---|
| CN | 106139799 B | 9/2018 |
| CN | 208426682 U | 1/2019 |

(Continued)

*Primary Examiner* — Brit E. Anbacht

(57) ABSTRACT

Disclosed are a semiconductor waste gas treatment system and a moisture-gas separator of the same. A moisture-gas separator is communicated between a wet scrubber and an air extraction device in the semiconductor waste gas treatment system. An air inlet pipe, a separation pipe and an exhaust pipe are communicated with one another in the moisture-gas separator. A diversion inclined partition is disposed obliquely in the separation pipe and a filter material layer filled in the separation pipe of the moisture-gas separator. The wet scrubber washes a process waste gas from a process waste gas source and discharges a scrubbed waste gas. The air extraction device provides a suction force so that the scrubbed waste gas first enters the separation pipe through the air inlet pipe, and is separated into water mist and dust, and then a dry waste gas is discharged through the exhaust pipe.

23 Claims, 13 Drawing Sheets

(56)                         References Cited

U.S. PATENT DOCUMENTS

| | | | | | | |
|---|---|---|---|---|---|---|
| 3,006,436 | A | * | 10/1961 | Starbuck | .................. | F24F 3/14 |
| | | | | | | 261/95 |
| 3,576,317 | A | * | 4/1971 | Huntington | ........... | B01D 53/18 |
| | | | | | | 261/98 |
| 3,772,858 | A | * | 11/1973 | Klugman | .............. | B01D 47/06 |
| | | | | | | 55/504 |
| 3,791,102 | A | * | 2/1974 | Huntington | ........... | B01D 47/00 |
| | | | | | | 261/36.1 |
| 3,957,464 | A | * | 5/1976 | Teller | .................... | B01D 47/12 |
| | | | | | | 95/224 |
| 4,437,867 | A | * | 3/1984 | Lerner | .................. | B01D 46/12 |
| | | | | | | 55/423 |
| 2007/0166463 | A1 | * | 7/2007 | Kelly | .................... | B01D 46/30 |
| | | | | | | 96/322 |

FOREIGN PATENT DOCUMENTS

| | | | | | |
|---|---|---|---|---|---|
| CN | 209735306 | U | 12/2019 | | |
| CN | 112604383 | A | 4/2021 | | |
| GB | 2035128 | A * | 6/1980 | ............ | B01D 46/34 |
| JP | S6339413 | | 3/1988 | | |
| JP | H0370718 | | 7/1991 | | |
| JP | 6018665 | | 11/2015 | | |
| JP | 2018103078 | A | 7/2018 | | |
| JP | 2021055667 | A | 4/2021 | | |
| JP | 2023039384 | A | 3/2023 | | |
| TW | M505971 | U | 8/2015 | | |
| TW | I574725 | B | 3/2017 | | |
| TW | I681810 | B | 1/2020 | | |
| WO | 2007094024 | A1 | 8/2007 | | |

* cited by examiner

SEMICONDUCTOR WASTE GAS TREATMENT SYSTEM AND MOISTURE-GAS SEPARATOR OF THE SAME

CROSS-REFERENCE TO RELATED APPLICATION

This application claims priority from Taiwan Patent Application No. 111148234, filed on Dec. 15, 2022, in the Taiwan Intellectual Property Office, the content of which are hereby incorporated by reference in their entirety for all purposes.

BACKGROUND OF THE DISCLOSURE

1. Field of Disclosure

The disclosure relates to a waste gas treatment system and its components, and more particularly to a semiconductor waste gas treatment system and a moisture-gas separator of the same.

2. Related Art

The production process of semiconductors uses a large amount of flammable, corrosive or highly toxic reactive gases. However, the utilization rate of reactive gases in many semiconductor processes is very low. Therefore, the residual gases and reaction products that are not completely reacted during the process must be discharged from the reaction process chamber. These mixed gases are generally called process waste gases or tail gases, and they must be converted into harmless or treatable substances before they can be discharged.

The current waste gas system mainly consists of a turbo pump, a mechanical pump and a local scrubber system connected to the reaction process chamber. The process waste gas is extracted from the reaction process chamber through the turbo pump, exhaust pipeline and mechanical pump sequentially, and sent to the local scrubber system for treatment, and then sent to the central scrubber system for discharge.

In order to properly handle process waste gas, many technologies have been proposed and used. For example, there is currently an existing technology that uses an air extraction pump to discharge the process waste gas to a combustion scrubber for waste gas treatment before discharging the process waste gas. However, the combustion scrubber is not very effective in treating fluorine compounds, and must be kept in operation at all times to provide a large amount of fuel gas. Therefore, the cost increases significantly and consumes a lot of energy. The fuel gas is a flammable and explosive gas, which will increase public security risks. In addition, although there is another existing technology that uses the catalyst thermal cracking method, the catalyst will have aging and poisoning problems, and the cost of catalyst replacement and recycling is quite high. However, the catalytic thermal cracking method also needs to be kept running at all times and also consumes a lot of energy.

Furthermore, there are currently technologies that use a wet waste gas treatment device to wash out solid particles such as toxic gases and dust from the process waste gas before performing the above-mentioned process waste gas combustion or cracking treatment, and then discharge the scrubbed waste gas after being washed. However, the scrubbing efficiency of traditional sprinkler-type wet waste gas treatment devices is not high, and the discharged scrubbed waste gas contains high humidity, and some toxic gases and solid particles still exist in the scrubbed waste gas. Therefore, it is easy for solid particles to adhere to the wall of the exhaust pipeline of the wet waste gas treatment device, eventually causing the outlet of the exhaust pipeline or the inlet of the conveying pipeline of the above-mentioned process waste gas combustion or cracking treatment equipment to be blocked by dust. Moreover, even if a gas-liquid separation component is disposed in the tank of the wet waste gas treatment device, the gas-liquid separation component can be easily clogged by dust and loses its filtration effect, and will reduce air conduction or increase the pressure difference. Furthermore, the traditional design of disposing the gas-liquid separation component in the tank of the wet waste gas treatment device cannot effectively separate the gas and liquid. Therefore, the maintenance cycle is very short and replacement inside the tank is time-consuming, resulting in increased costs, and it is still incapable of solving the above-mentioned problem of the outlet of the exhaust pipeline or the inlet of the conveying pipeline being blocked by dust.

SUMMARY OF THE DISCLOSURE

In view of the above, one object of the disclosure is to provide a semiconductor waste gas treatment system and a moisture-gas separator of the same to solve the above-mentioned problems of the conventional technologies.

In order to achieve the aforementioned object, the disclosure provides a moisture-gas separator applicable for longitudinal communication between a wet scrubber and an air extraction device. The moisture-gas separator at least comprises an air inlet pipe, a separation pipe and an exhaust pipe, the separation pipe is disposed longitudinally to communicate between the air inlet pipe and the exhaust pipe, wherein the air inlet pipe is disposed longitudinally to communicate with an exhaust port of the wet scrubber, and the exhaust pipe is disposed longitudinally to communicate with an air extraction port of the air extraction device; at least one diversion inclined partition, the at least one diversion inclined partition is obliquely disposed in the separation pipe; and at least one filter material layer filled in the separation pipe and located on the at least one diversion inclined partition to form a plurality of filtration sections, wherein the wet scrubber washes a process waste gas discharged from a process waste gas source and discharges a scrubbed waste gas, the air extraction device provides a suction force so that the scrubbed waste gas discharged by the wet scrubber first enters the separation pipe through the air inlet pipe, and is separated into water mist and dust contained in the scrubbed waste gas through the filter material layer and the at least one diversion inclined partition in the separation pipe such that the scrubbed waste gas becomes a dry waste gas, and then the dry waste gas is discharged through the exhaust pipe.

In order to achieve the aforementioned object, the disclosure provides a semiconductor waste gas treatment system for treating a process waste gas discharged from a process waste gas source, and at least comprising: a wet scrubber, the wet scrubber washes the process waste gas and discharges a scrubbed waste gas; the moisture-gas separator is disposed externally on a tank of the wet scrubber; and an air extraction device, wherein the moisture-gas separator is communicated between the wet scrubber and the air extraction device, the air extraction device provides a suction force so that the scrubbed waste gas discharged by the wet scrubber is first separated into water mist and dust contained in the scrubbed waste gas by the moisture-gas separator to form a dry waste gas, and then the dry waste gas is discharged.

Based on the above, the semiconductor waste gas treatment system and the moisture-gas separator of the same of the disclosure have the following advantages:

(1) The moisture-gas separator performs a separation and filtration process outside the tank of the wet scrubber. Therefore, it is not limited to only capable of performing the separation and filtration process inside the tank of the wet scrubber, and a gas-liquid separation component installed inside the tank of the wet scrubber could be omitted.

(2) The moisture-gas separator is not only capable of maintaining separation and filtration efficacies of water mist and dust, but is further capable of providing transparent visualization, detachable and heatable designs, thereby achieving improvement effects of observation of pressure changes, quick replacement and extended maintenance cycle.

(3) The diversion inclined partition of the moisture-gas separator is disposed obliquely in the separation pipe instead of disposed horizontally. Therefore, effects of water mist separation and air flow guidance could be provided at the same time, so water mist could be separated and air conduction could be prevented from being affected.

(4) A heating belt could heat pipe fittings and the dry waste gas discharged from the moisture-gas separator to prevent clogging caused by water mist or dust residue.

In order to enable the examiner to have a further understanding and recognition of the technical features of the disclosure, preferred embodiments in conjunction with detailed explanation are provided as follows.

DETAILED DESCRIPTION OF THE DISCLOSURE

Figure 1:
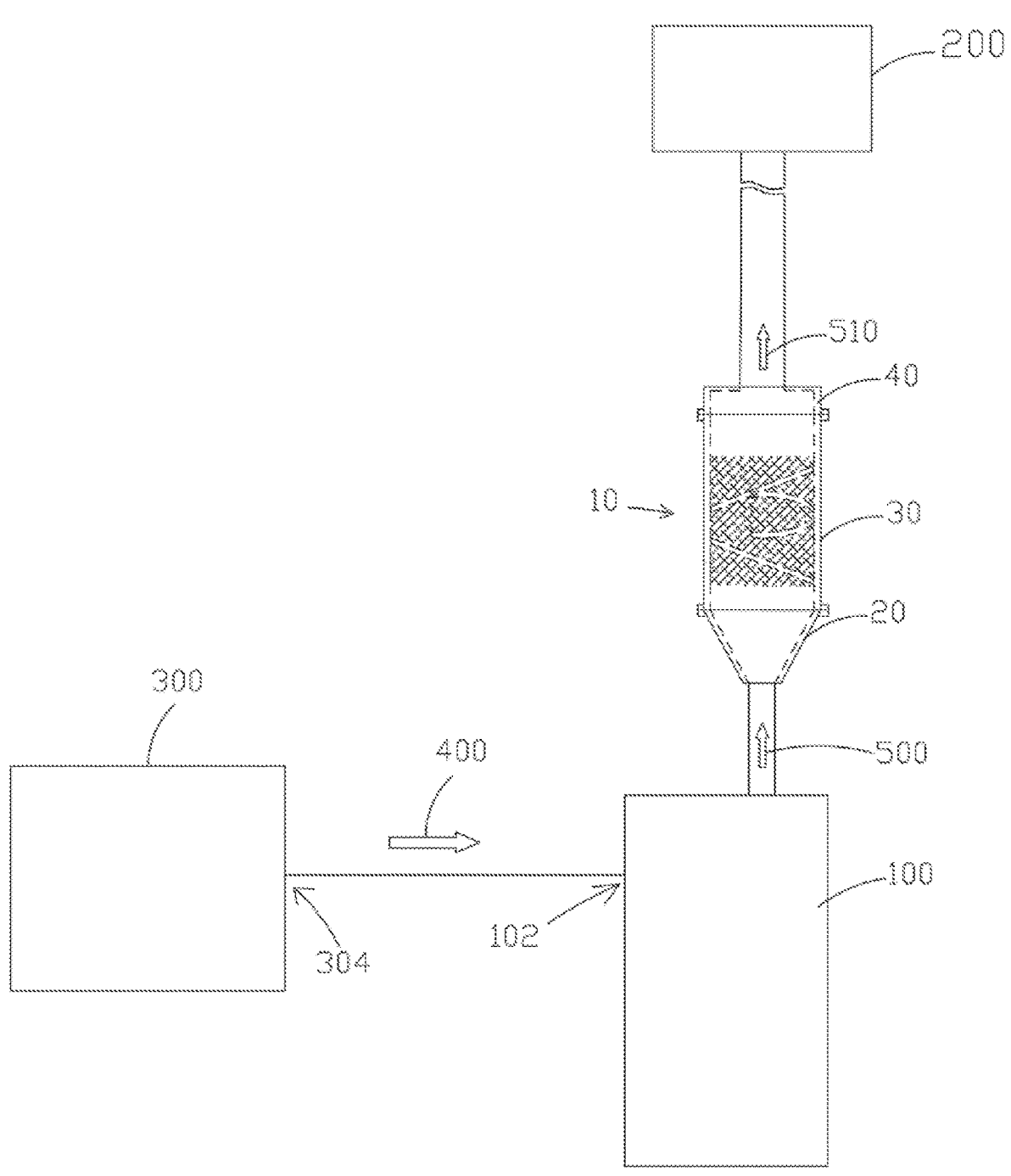
FIG. 1 is a schematic diagram illustrating operation of a semiconductor waste gas treatment system and a moisture-gas separator of the same according to the disclosure.

In order to understand the technical features, content and advantages of the disclosure and its achievable efficacies, the disclosure is described below in detail in conjunction with the figures, and in the form of embodiments, the figures used herein are only for a purpose of schematically supplementing the specification, and may not be true proportions and precise configurations after implementation of the disclosure; and therefore, relationship between the proportions and configurations of the attached figures should not be interpreted to limit the scope of the claims of the disclosure in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present disclosure will be defined below or in other parts of the descriptions as an extra guidance for those skilled in the art to understand the descriptions of the present disclosure.

The terms such as "first", "second", "third" and "fourth" used in the descriptions are not indicating an order or sequence, and are not intending to limit the scope of the present disclosure. They are used only for differentiation of components or operations described by the same terms.

Moreover, the terms "comprising", "including", "having", and "with" used in the descriptions are all open terms and have the meaning of "comprising but not limited to".

The disclosure provides a semiconductor waste gas treatment system and a moisture-gas separator of the same. Please refer to FIG. 1 for a schematic diagram illustrating operation of a semiconductor waste gas treatment system and a moisture-gas separator of the same according to the disclosure. The semiconductor waste gas treatment system is used to treat a process waste gas 400 discharged by a process waste gas source 300. The semiconductor waste gas treatment system at least comprises a wet scrubber 100, a moisture-gas separator 10 and an air extraction device 200. The moisture-gas separator 10 of the disclosure is applicable for longitudinal communication between the wet scrubber 100 and the air extraction device 200. The wet scrubber 100 performs a washing process to wash the process waste gas 400 discharged from the process waste gas source 300 of the semiconductor waste gas treatment system, so that the process waste gas 400 becomes a scrubbed waste gas 500. The air extraction device 200 provides a suction force to create a negative pressure environment (low-pressure environment) between the wet scrubber 100 and the air extraction device 200, so that through the suction force the scrubbed waste gas 500 formed after the wet scrubber 100 has washed the process waste gas 400 could be sucked from a bottom of the moisture-gas separator 10 into the moisture-gas separator 10, and the moisture-gas separator 10 performs a separation and filtration process on the scrubbed waste gas 500, and then a dry waste gas 510 is sucked out from a top of the moisture-gas separator 10 after separation and treatment. Wherein the dry waste gas 510 discharged after the moisture-gas separator 10 of the disclosure performs the separation and filtration process is a relatively dry waste gas that has been removed of most of water mist and dust (solid particles).

One feature of the moisture-gas separator 10 of the semiconductor waste gas treatment system of the disclosure is that the moisture-gas separator 10 is disposed externally on a tank of the wet scrubber 100, so the separation and filtration process could be performed externally on the tank of the wet scrubber 100, rather than limited to being only capable of performing the separation and filtration process inside the tank of the wet scrubber 100. Moreover, the separated water mist could further be automatically recovered into the wet scrubber 100 by gravity for reuse. The moisture-gas separator 10 of the disclosure is not only capable of maintaining separation and filtration efficacies of water mist and dust, but further capable of providing transparent visualization, detachable and heatable designs, thereby achieving improvement effects of observation of pressure changes, quick replacement and extended maintenance cycle. Type and structure of the wet scrubber 100 applicable to the disclosure are not particularly limited, as long as the process waste gas 400 could be washed, any type and structure could be applied to the disclosure. In addition, by disposing the moisture-gas separator 10, the wet scrubber 100 applicable to the semiconductor waste gas treatment system of the disclosure could further optionally omit gas-liquid separation components provided inside the tank of the wet scrubber 100, such as fiber bed demister, etc., thereby improving speed, cost and cycle of maintenance accordingly. Even if the moisture-gas separator 10 of the disclosure is located externally on the tank of the wet scrubber 100, effects of blocking a considerable amount of water mist and dust in the moisture-gas separator 10 could still be exerted, and the separated and filtered water mist could still automatically flow back to the tank of the wet scrubber 100 to be reused. Taking a gas flow rate of about 0.2 m/s to about 3.8 m/s as an example, the moisture-gas separator 10 of the disclosure could provide a filtration efficiency of at least about 90%. Taking a gas flow rate of about 1.5 m/s as an example, a filtration efficiency of the moisture-gas separator 10 of the disclosure could even be as high as about 98%.

Figure 2:
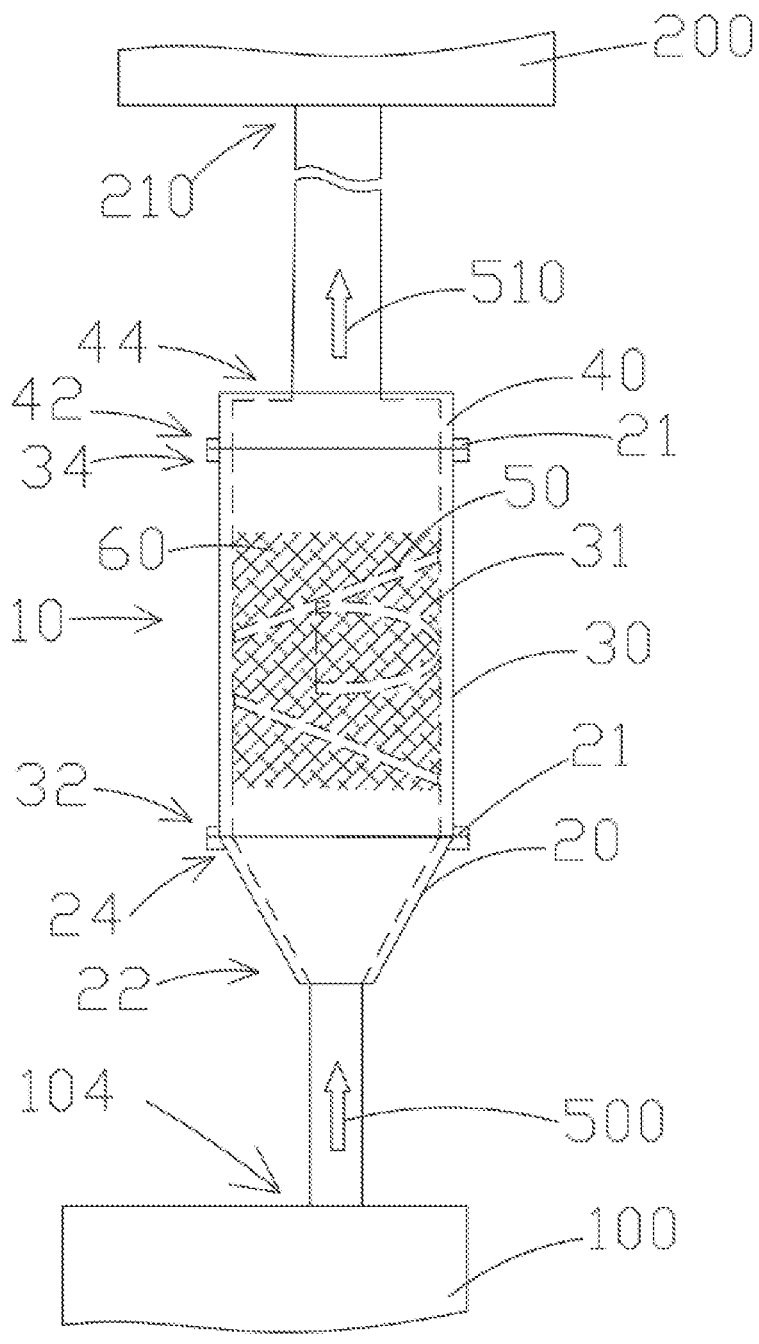
FIG. 2 is a side perspective view of the moisture-gas separator of the disclosure disposed between a tank externally of a wet scrubber and an air extraction device.
Figure 3:
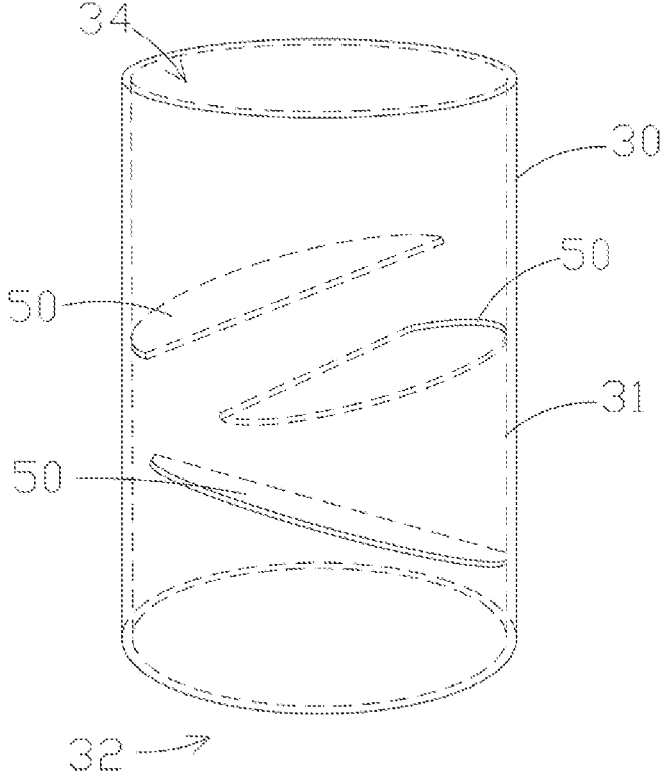
FIG. 3 is a perspective view of a separation pipe of the moisture-gas separator of the disclosure.
Figure 4:
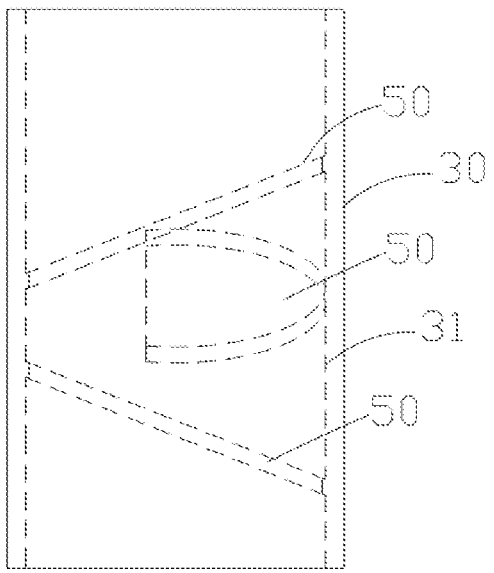
FIG. 4 is a perspective view of the separation pipe of the moisture-gas separator of the disclosure along a first direction.
Figure 5:
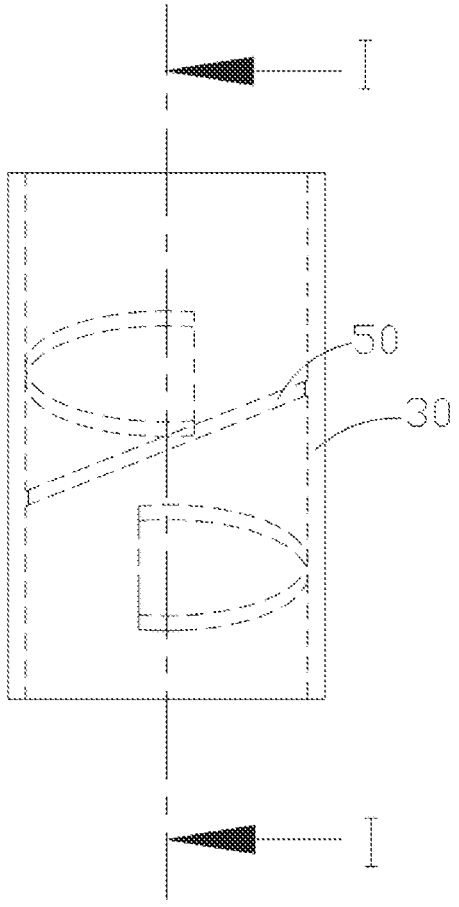
FIG. 5 is a perspective view of the separation pipe of the moisture-gas separator of the disclosure along a second direction, wherein the second direction is perpendicular to the first direction.
Figure 6:
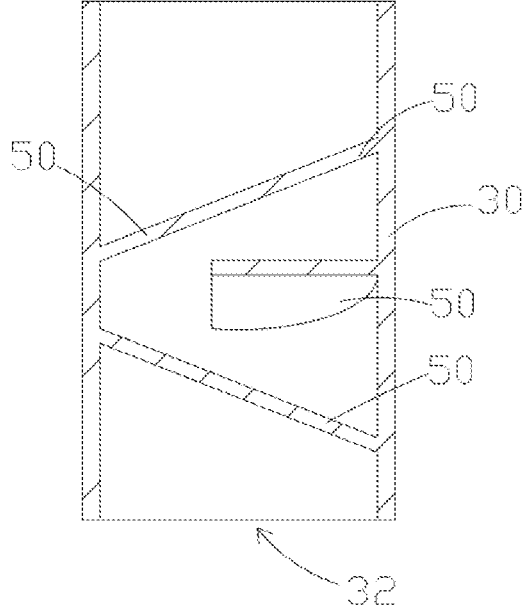
FIG. 6 is a cross-sectional view taken along the section line I-I in FIG. 5.

For details, please continue to refer to FIG. 1 and FIG. 2 to FIG. 7. FIG. 2 is a a side perspective view of the moisture-gas separator 10 of the disclosure disposed between the tank externally of the wet scrubber 100 and the air extraction device 200. FIGS. 3 to 7 are schematic diagrams of a separation pipe of the moisture-gas separator 10 of the disclosure respectively. To simplify the illustration for easier reading, a filter material layer is omitted. The moisture-gas separator 10 of the disclosure at least comprises an air inlet pipe 20, a separation pipe 30 and an exhaust pipe 40 communicated with one another, and comprises at least one diversion inclined partition 50 and a filter material layer 60 located in the separation pipe 30. The separation pipe 30 is disposed longitudinally to communicate between the air inlet pipe 20 and the exhaust pipe 40. An air inlet port 32 and an exhaust port 34 of the separation pipe 30 are connected to an exhaust port 24 of the air inlet pipe 20 and an air inlet port 42 of the exhaust pipe 40 respectively. The air inlet pipe 20 is disposed longitudinally to communicate with an exhaust port 104 of the wet scrubber 100 via an air inlet port 22, and the exhaust pipe 40 is disposed longitudinally to communicate with an air extraction port 210 of the air extraction device 200 via an exhaust port 44. Wherein the separation pipe 30, for example, could be fixedly disposed between the air inlet pipe 20 and the exhaust pipe 40. Alternatively, the separator pipe 30, for example, could also be detachably disposed between the air inlet pipe 20 and the exhaust pipe 40, and with a detachable kit design, if engineering staff need to repair the moisture-gas separator 10, the separation pipe 30 could be directly removed from between the air inlet pipe 20 and the exhaust pipe 40, without having to assemble and weld on site, so maintenance hours could be significantly shortened. The separation pipe 30, for example, could be detachably connected to the air inlet pipe 20 and the exhaust pipe 40 by screwing, socketing, engaging or using a flange 21 (as shown in FIG. 2) or other assembly methods. However, the disclosure is not limited thereto, any feasible technology that enables the separation pipe 30 to be detachably connected to the air inlet pipe 20 and/or the exhaust pipe 40 could be applied to the disclosure.

The disclosure uses a suction force provided by the air extraction device 200 to cause the wet scrubber 100 to discharge the scrubbed waste gas 500 after being treated with a washing process. Therefore, the scrubbed waste gas 500 will be sucked into the moisture-gas separator 10, so that the filter material layer 60 and the diversion inclined partition 50 in the separation pipe 30 could perform the separation and filtration process on the scrubbed waste gas 500, thereby separating most of water mist and dust contained in the scrubbed waste gas 500 to form the dry waste gas 510, and then the dry waste gas 510 that is relatively dry is discharged through the exhaust pipe 40 for subsequent central waste gas treatment or for discharge externally. The air inlet pipe 20, the separation pipe 30 and the exhaust pipe 40 are made of, for example, chlorinated polyvinyl chloride (CPVC) pipe or other pipe fitting materials, and the separation pipe 30 is optionally made of a transparent material. Through transparent visualization design, engineering staff are capable of observing filtration effect and degree of water mist and dust contained in the scrubbed waste gas 500, and conveniently observing pressure changes of the air inlet port 22 of the air inlet pipe 20 and the exhaust port 44 of the exhaust pipe 40 in order to establish an appropriate maintenance cycle. In addition, the diversion inclined partition 50 could be optionally made of a same material as that of the separation pipe 30, and could be optionally made of a transparent material, so that engineering staff are capable of observing filtration effect and degree of water mist and dust contained in the scrubbed waste gas 500.

As shown in FIGS. 2 to 7, another feature of the disclosure is that the diversion inclined partition 50 is obliquely disposed in the separation pipe 30, and for example, is disposed obliquely on a pipe wall 31 of the separation pipe 30, instead of disposed horizontally on the pipe wall 31 of the separation pipe 30. The filter material layer 60 is filled in the separation pipe 30 and is located on the diversion inclined partition 50, for example, located above and/or below the diversion inclined partition 50 to form a plurality of filtration sections. Taking the three diversion inclined partitions 50 shown in FIG. 3 as an example, the filter material layer 60 could constitute approximately four filtration sections. An inclination direction of the diversion inclined partition 50 is, for example, from below the separation pipe 30 (i.e., the air inlet port 32 side) to above the separation pipe 30 (i.e., the exhaust port 34 side), thereby providing effects of water mist separation and air flow guidance at the same time, and capable of reducing impact on air conduction of the moisture-gas separator 10. Since the moisture-gas separator 10 of the disclosure is applied in a waste gas treatment system of a semiconductor manufacturing process, the filter material layer 60 could be optionally an erosion-resistant filter material that is resistant to acid, alkali, oil and gas, or organic solvents. The filter material layer 60 is easy to clean, could be reused, and has effects of flame retardancy, extremely low pressure loss and light in weight. For example, the filter material layer 60 is a filter structure composed of a plurality of staggered and stacked plastic strips or at least one plastic strip. The filter material layer 60 could be, for example, polyester plastic, and a diameter of each of the plastic strips is any numerical value from about 0.01 mm to 3 mm, for example, about 0.1 mm, and a number after staggering and stacking is any numerical value from about 100 (mesh/inch)) to 1,000 (mesh/inch), for example, about 500 (mesh/inch). Alternatively, the disclosure could further first make the filter material layer 60 into filter material strips, a width of which is approximately equal to or slightly larger than a diameter of the separation pipe 30, and a thickness is any numerical value approximately from 10 mm to 100 mm, for example, any numerical value from 25 mm to 50 mm, and for example, one piece of filter material strip is inserted in each of the filtration sections above and/or below the diversion inclined partition 50. A volume ratio of the filter material layer 60 to the separation pipe 30 is any numerical value from about 1/10 to 1/1, for example, any numerical value from about 1/2 to 1/1. Although the air inlet pipe 20, the separation pipe 30 and the exhaust pipe 40 of the disclosure are cylindrical as an example, they are not limited thereto. An outer shape of the air inlet pipe 20, the separation pipe 30 and the exhaust pipe 40 of the disclosure is not particularly limited, for example, an outer shape could be polygonal cylinder or other shapes with hollow structures.

Figure 8:
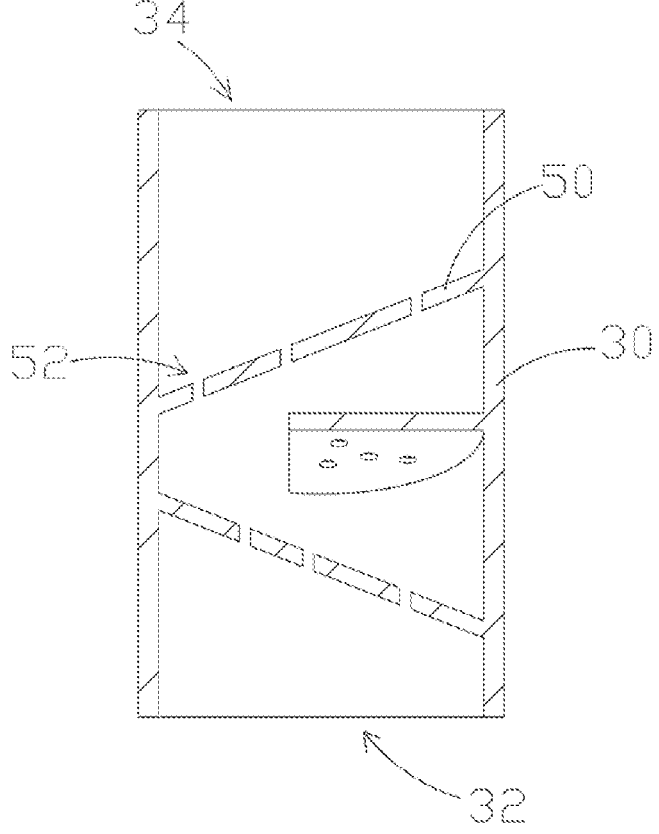
FIG. 8 is a cross-sectional view of a diversion inclined partition of the moisture-gas separator of the disclosure equipped with ventilation holes.

The diversion inclined partition 50 of the disclosure could further be optionally provided with a plurality of ventilation holes 52 longitudinally or obliquely penetrating an upper surface and a lower surface of the diversion inclined partition 50, as shown in FIG. 8. An object of disposing the ventilation holes 52 is to enable the dry waste gas 510 to pass through them, while blocking and filtering water mist and dust. Therefore, a pore size of the ventilation holes 52 is, for example, larger than a diameter of gas molecules, but smaller than a diameter of water mist and dust. However, the disclosure is not limited thereto. Moreover, since water mist and dust are usually gradually blocked and intercepted by the filter material layer 60 before contacting the diversion inclined partition 50, a pore size of the ventilation hole 52 could further be optionally larger than a diameter of water mist and dust to further avoid reducing air conduction or increasing pressure difference. In addition, the lower surface of the diversion inclined partition 50 is a flat surface, or interception structures such as convex ribs or grooves are optionally provided on the lower surface. In this way, if water mist and dust contact the diversion inclined partition 50, interception structures such as convex ribs or grooves could cause water mist and dust to gather in the interception structures, thereby increasing weight and falling due to gravity. Therefore, effects of filtration and separation of water mist and dust could further be improved.

A diameter of the separation pipe 30 of the moisture-gas separator 10 of the disclosure is, for example, larger than a diameter of the air inlet port 22 of the air inlet pipe 20, that is, a diameter of the separation pipe 30 is, for example, larger than a diameter of the exhaust port 104 of the wet scrubber

100. Thereby achieving an effect of performing the separation and filtration process on the scrubbed waste gas 500, and avoiding adverse effects on air conduction or pressure difference. For example, a ratio of a diameter of the separation pipe 30 to a diameter of the exhaust port 104 is approximately between 1:1 and 10:1, such as approximately 2:1, but the disclosure is not limited thereto. A ratio of a diameter of the separation pipe 30 to a diameter of the exhaust port 104 could also be greater than 10:1, for example. In addition, the air inlet pipe 20 is, for example, a variable diameter pipe, that is, a diameter of the air inlet pipe 20 increases from the air inlet port 22 to the exhaust port 24, and increases, for example, in a progressive or segmented manner, until a diameter of the exhaust port 24 is substantially the same as a diameter of the air inlet port 32 of the separation pipe 30. The separation pipe 30 could be, for example, a constant diameter pipe or a variable diameter pipe.

Figure 7:
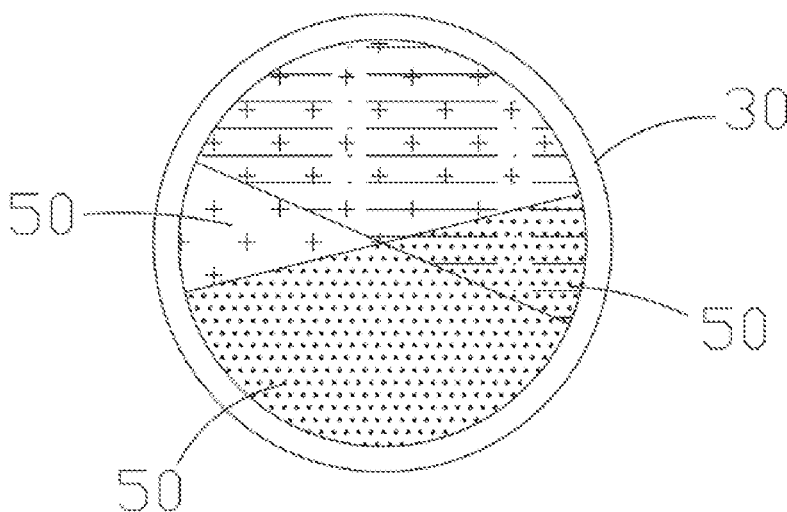
FIG. 7 is a top view of the separation pipe of the moisture-gas separator of the disclosure.
Figure 9:
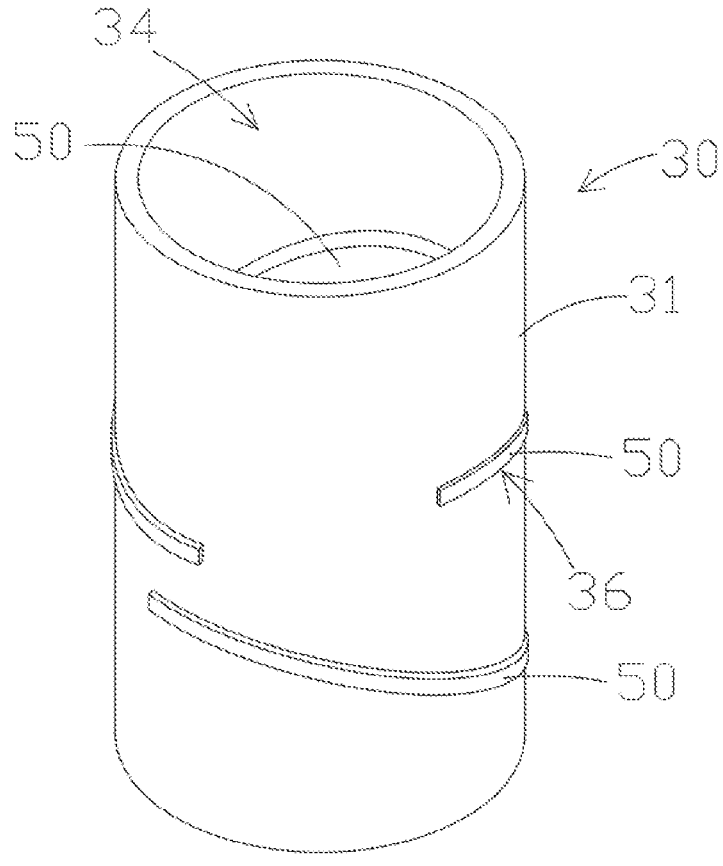
FIG. 9 is a perspective view of the diversion inclined partition of the moisture-gas separator of the disclosure detachably disposed in the separation pipe.

As mentioned above, a feature of the disclosure is that the diversion inclined partition 50 is disposed obliquely in the separation pipe 30. The diversion inclined partition 50 is, for example, fixedly or detachably disposed on the pipe wall 31 of the separation pipe 30. As shown in FIG. 9, taking detachable design as an example, the separation pipe 30, for example, has at least one through groove 36 obliquely distributed along a surface of the pipe wall 31, and the diversion inclined partition 50 is, for example, airtightly inserted into the through groove 36 from outside to inside in order to maintain a negative pressure environment during the separation and filtration process. Numbers and sizes of the diversion inclined partition 50 and the through groove 36 correspond to each other. Since the diversion inclined partition 50 is detachably disposed on the pipe wall 31 of the separation pipe 30, engineering staff could optionally change form or size of the diversion inclined partition 50 according to actual process requirements. In the disclosure, a number of the diversion inclined partition 50 is not limited to one or more than one, for example, three as shown in FIGS. 2 to 9. Moreover, the diversion inclined partition 50 is, for example, an arc-shaped plate, such as a semicircular plate (as shown in FIG. 7), or a polygonal plate, such as a square plate or other rectangular plate. However, an outer shape of the diversion inclined partition 50 is not limited thereto. The diversion inclined partition 50 could further be, for example, in a fan shape or other forms, such as a spiral plate structure. Taking the single diversion inclined partition 50 as an example, the diversion inclined partition 50 is disposed obliquely in the separation pipe 30, and a projection area of the diversion inclined partition 50 is determined according to an outer shape thereof, and is not limited to partially or entirely overlapping the air inlet port 32 of the separation pipe 30. As long as the separation and filtration process could be carried out, partially or entirely overlapping could be applied to the disclosure. Taking the diversion inclined partitions 50 as an example, the diversion inclined partitions 50 are respectively disposed obliquely in the separation pipe 30 and are staggeredly distributed inside an interior of the separation pipe 30 in layers. Wherein the projection areas of the diversion inclined partitions 50 partially overlap with the air inlet port 32 of the separation pipe 30 respectively, and jointly entirely overlap with the air inlet port 32 of the separation pipe 30. Although the diversion inclined partition 50 of the disclosure is exemplified by a flat plate structure shown in FIGS. 2 to 9, this is not intended to limit a scope of the disclosure.

As shown in FIG. 1, the process waste gas source 300 is, for example, a semiconductor process chamber used to perform a semiconductor manufacturing process. The process waste gas 400 is, for example, a waste gas discharged from the semiconductor manufacturing process, such as toxic waste gas or greenhouse gas that carries particulates. Wherein the disclosure is not limited to a specific semiconductor process chamber and a type of semiconductor manufacturing process implemented. As long as the process waste gas 400 is produced, the semiconductor waste gas treatment system to which the disclosure is applied could be applicable for waste gas treatment. For example, depending on a semiconductor manufacturing process implemented, the process waste gas source 300 of the disclosure, for example, could be a semiconductor process chamber, or for example, could be a semiconductor processing system with a semiconductor process chamber equipped with a turbo pump to discharge the process waste gas. In other words, the process waste gas source 300 applicable to the semiconductor waste gas treatment system applied in the disclosure is not limited to the above examples, any waste gas source that discharges semiconductor process waste gas could be applicable to the disclosure. Wherein the process waste gas 400 is a process waste gas generated in a semiconductor manufacturing process, such as, but is not limited to, perfluorocarbons (PFCs), nitrogen oxides (NOx), sulfur hexafluoride (SF$_6$), nitrogen trifluoride (NF$_3$), ammonia (NH$_3$), boroethane (B$_2$H$_6$), hydrofluorocarbons (HFCs) and/or hydrocarbons (C$_x$H$_y$) and other toxic gases or greenhouse gases. If the semiconductor manufacturing process is an atomic layer deposition (ALD) process, a process waste gas is, for example, but is not limited to, trimethylaluminum (TMA), tetrakis (ethylmethylamino) zirconium (TEMAZ) and/or tetrakis (ethylmethylamino) hafnium (TEMAH).

The air extraction device 200 of the semiconductor waste gas treatment system is, for example, a vacuum pump. As shown in FIG. 1, the wet scrubber 100 is communicated to an exhaust end 304 of the process waste gas source 300 through an air inlet port 102 in order to use a washing liquid to perform a washing process on the process waste gas 400 discharged by the process waste gas source 300, so that the process waste gas 400 becomes the scrubbed waste gas 500 after being washed. For example, through a suction force provided by the air extraction device 200, the scrubbed waste gas 500 is discharged from the exhaust port 104 of the wet scrubber 100 to the moisture-gas separator 10 for performing the separation and filtration process. Wherein a vacuum degree of the air extraction device 200 is adjusted accordingly according to actual semiconductor manufacturing process requirements, for example, between about 400 torr to about 600 torr, or even between about 760 torr to about 10$^{-3}$ torr.

As mentioned above, type and structure of the wet scrubber 100 applicable to the disclosure are not particularly limited. As long as the process waste gas 400 could be washed, any type and structure could be applied to the disclosure. For example, in one embodied mode of the disclosure, the wet scrubber 100, for example, uses a negative pressure jet pipe to eject a washing liquid at high speed, thereby creating a low-pressure environment that inhales the process waste gas 400 discharged from the process waste gas source 300, and the process waste gas 400 is cut into microbubbles with a relatively small buoyancy and a considerable increase in an overall surface area by using the high-speed washing liquid. Therefore, during a long-term retention process of microbubbles slowly floating upward from a depth of the washing liquid, the washing liquid is capable of fully capturing and absorbing the microbubbles and dust and other solid particles the microbubbles carry.

Then, the disclosure could use a suction force provided by the air extraction device 200 to cause the wet scrubber 100 to discharge the scrubbed waste gas 500 after being treated with a washing process, so the scrubbed waste gas 500 could enter the moisture-gas separator 10 communicated to the wet scrubber 100 in order to carry out the separation and filtration process.

Figure 10:
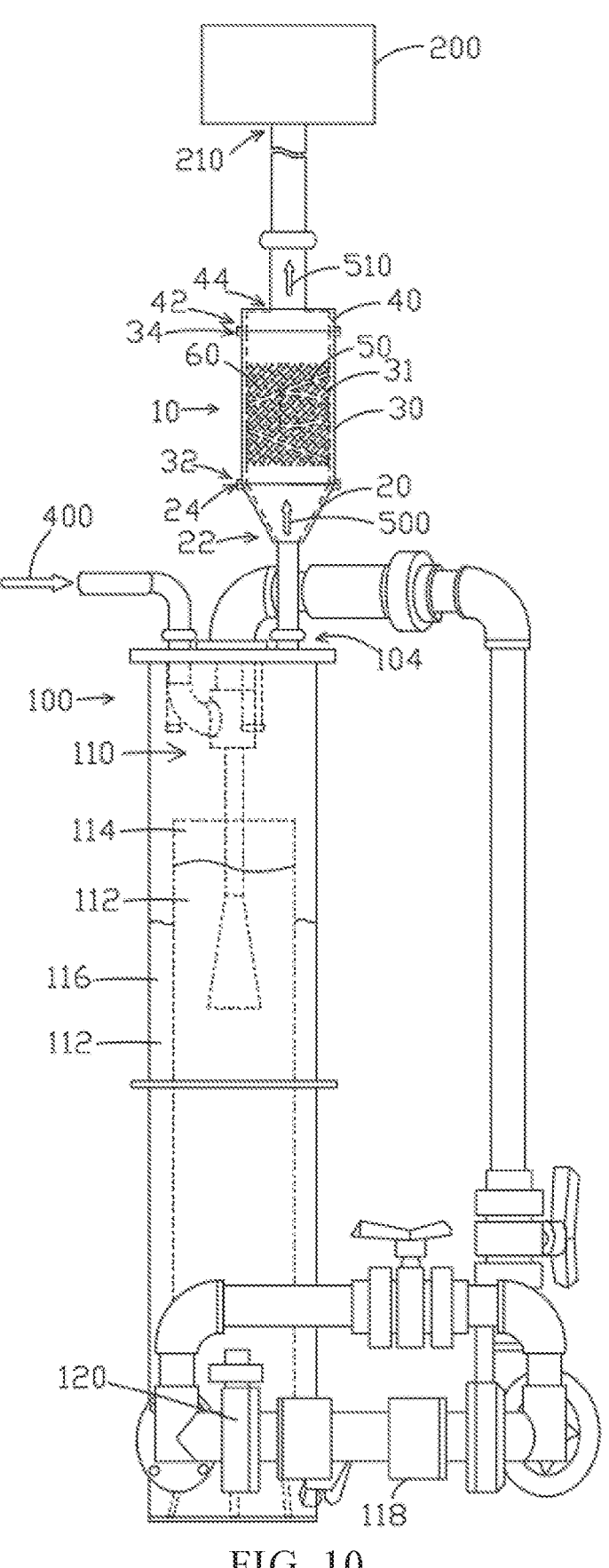
FIG. 10 is a structural diagram of the wet scrubber of the semiconductor waste gas treatment system of the disclosure.

In detail, please refer to FIG. 10. The wet scrubber 100 of the semiconductor waste gas treatment system uses, for example, the Venturi throat principle to cause a negative pressure jet pipe 110 to eject a washing liquid 112, and a low-pressure environment is generated between the process waste gas source 300 (as shown in FIG. 1) and the wet scrubber 100 to suck in the process waste gas 400 discharged by the process waste gas source 300, and the high-speed washing liquid 112 cuts the process waste gas 400 into microbubbles. By greatly increasing contact area and contact time, the washing liquid 112 is capable of fully dissolving the reaction process waste gas 400 and capturing dust and other particles, thereby turning the washed process waste gas 400 into the scrubbed waste gas 500. In detail, as shown in FIG. 10, the wet scrubber 100 used in the disclosure is a jet microbubble wet waste gas scrubber using the Venturi throat principle as an example. Wherein the wet scrubber 100 uses the negative pressure jet pipe 110 to eject the washing liquid 112 longitudinally at high speed and generate a low-pressure environment (any numerical value between about 760 torr to 10$^{-3}$ torr, such as a negative pressure of about 400 torr to 600 torr) to suck in the process waste gas 400. A volume of the washing liquid 112 accounts for, for example, about 50% to 90% of a volume of an inner tank 114 in a treatment tank, preferably about 60% to 80%, and more preferably about 70%. Moreover, when the washing liquid 112 impacts the washing liquid 112 in the inner tank 114 of the treatment tank downward at high speed from the negative pressure jet pipe 110, the process waste gas 400 will be cut and a plurality of microbubbles (average diameter less than about 1.0 mm, for example, further less than 0.1 mm) will be formed in the washing liquid 112, its size is much smaller than traditional bubbles, so a surface area is much larger than traditional bubbles, and in a process of microbubbles moving upward from a depth of the washing liquid 112 in the inner tank 114 of the treatment tank, since contact area and contact time are greatly increased, the microbubbles are capable of fully contacting the washing liquid 112. Because the process waste gas 400 will be dissolved in the washing liquid 112, the microbubbles will gradually shrink in volume as they rise, and then disappear in the washing liquid 112. Since a tank wall of the inner tank 114 has holes, the washing liquid 112 in the inner tank 114 is capable of maintaining communication with the washing liquid 112 in an outer tank 116 of the treatment tank through the holes. The washing liquid 112 contains chemicals for treating the corresponding process waste gas 400. The chemicals are, for example, but not limited to, selected from a group consisting of saline solution, sodium hydroxide, calcium hydroxide, calcium carbonate and sodium bicarbonate. That is, a composition of the washing liquid 112 could be determined by the process waste gas 400 that needs to be treated, and a suitable base could be used for neutralization to reduce formation of an acidic solution, for example, a solution composed of fresh water and sodium hydroxide or other neutralizing agents (such as lime) could effectively extract and neutralize a large amount of HCl, SO$_2$ or other acid-containing components in the process waste gas 400. Calcium hydroxide (Ca(OH)$_2$), calcium carbonate (CaCO$_3$), and/or sodium bicarbonate (NaHCO$_3$), for example, could be mixed with the washing liquid 112 to help absorb other acidic process waste gases 400 from various production sources. Therefore, during a process of the microbubbles contacting the washing liquid 112, the process waste gas 400 could be fully dissolved in the washing liquid 112, and the washing liquid 112 is capable of fully capturing particles.

Subsequently, the scrubbed waste gas 500 formed after the process waste gas 400 is washed diffuses to a liquid surface of the inner tank 114 along with the washing liquid 112 to form water mist, and through a suction force provided by the air extraction device 200, the scrubbed waste gas 500 is discharged from the exhaust port 104 of the wet scrubber 100 to the moisture-gas separator 10 to perform the separation and filtration process of water mist. Therefore, the moisture-gas separator 10 could play a role of filtering and capturing water mist and dust, so that the scrubbed waste gas 500 forms the dry waste gas 510, and the dry waste gas 510 could be discharged to a central waste gas treatment system, for example. In addition, water mist and dust of the scrubbed waste gas 500 blocked and separated by the moisture-gas separator 10 of the disclosure will fall into the outer tank 116 or the inner tank 114 of the wet scrubber 100. Subsequently, for example, a filter component 118 could be used to filter the washing liquid 112 in the outer tank 116 or the inner tank 114 of the treatment tank, and then a water pump 120 could be used to inject the filtered washing liquid 112 into the inner tank 114 of the treatment tank through the negative pressure jet pipe 110, thereby cyclically generating negative pressure and cutting the process waste gas 400 to form a plurality of microbubbles in the washing liquid 112 in order to achieve an effect of saving water resources. In other words, as mentioned above, the wet scrubber 100 applicable to the disclosure does not require an additional gas-liquid separation component inside the tank of the wet scrubber 100, that is, the gas-liquid separation component provided inside the tank of the wet scrubber 100 could be optionally omitted, thereby repair and maintenance speed, cost and cycle could be improved accordingly.

Figure 11:
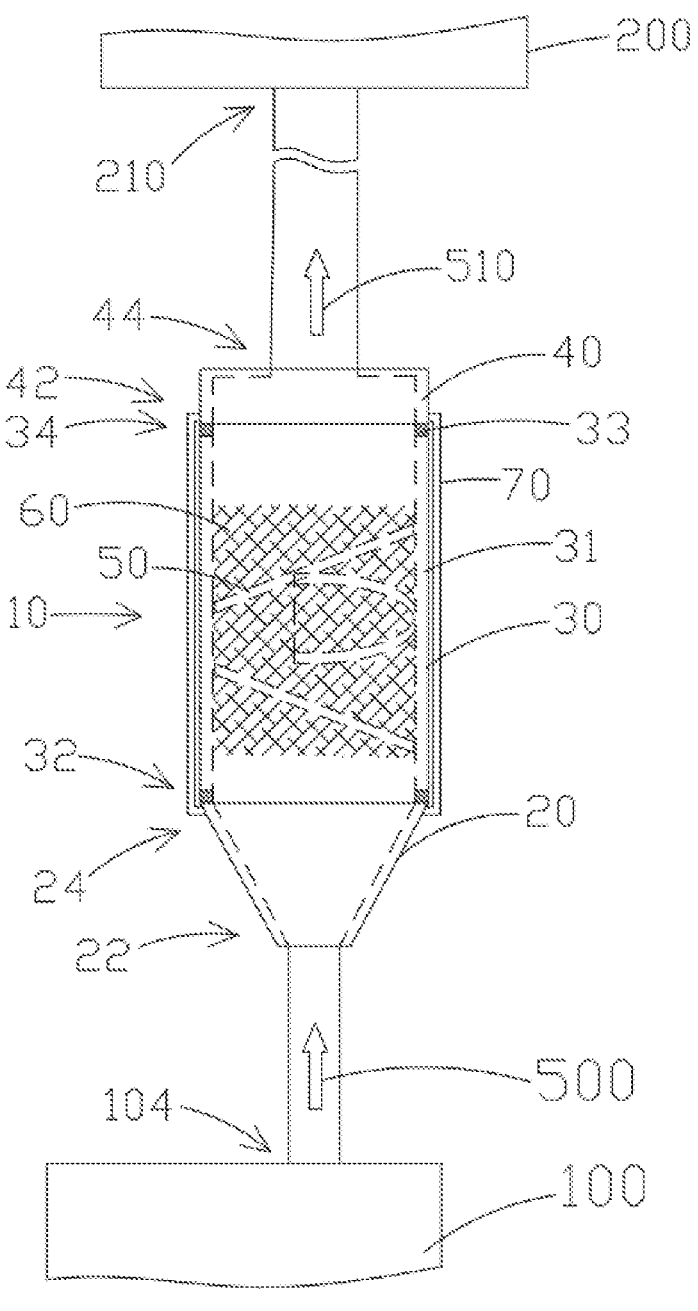
FIG. 11 is a schematic diagram of the moisture-gas separator of the disclosure equipped with the rotating separation pipe.

In addition, FIG. 11 is a schematic diagram of the moisture-gas separator of the disclosure equipped with the rotating separation pipe. As shown in FIG. 11, in a feasible implementation mode, the separation pipe 30 of the moisture-gas separator 10 of the disclosure and the diversion inclined partition 50 and the filter material layer 60 in the separation pipe 30 are rotatably disposed between the air inlet pipe 20 and the exhaust pipe 40, separation and filtration effects of the separation and filtration process could be further improved through rotation. Wherein the separation pipe 30 could be, for example, but is not limited to, rotatably disposed between the air inlet pipe 20 and the exhaust pipe 40 through a rotating element 33 such as an annular bearing. Although the separation pipe 30 of the disclosure and the diversion inclined partition 50 and the filter material layer 60 in the separation pipe 30 could be rotated by electric power and components, another feature of the disclosure is that the disclosure, for example, could further only utilize an air flow of the scrubbed waste gas 500 discharged from the wet scrubber 100 to rotate the separation pipe 30, so the diversion inclined partition 50 and the filter material layer 60 provided in the separation pipe 30 could also be rotated synchronously. Therefore, the disclosure could achieve an efficacy of improving separation and filtration effects while omitting additional electric power and component costs required for rotation. In addition, the moisture-gas separator 10 of the disclosure is optionally provided with an outer sleeve 70 to cover the rotatable separation pipe 30 and maintain a suction force generated by the air extraction device 200. For example, two ends of the outer sleeve 70 are airtightly connected to the air inlet pipe 20 and the exhaust pipe 40 respectively, and the separation pipe 30 is rotatably located inside the outer sleeve 70, thereby capable of performing the separation and filtration process while maintaining the above-mentioned negative pressure environment. The two ends of the outer sleeve 70, for example, could be fixedly or detachably connected to the air inlet pipe 20 and the exhaust pipe 40. A material of the outer sleeve 70 could be optionally the same as that of the separation pipe 30, and could also be optionally made of a transparent material.

Figure 12:
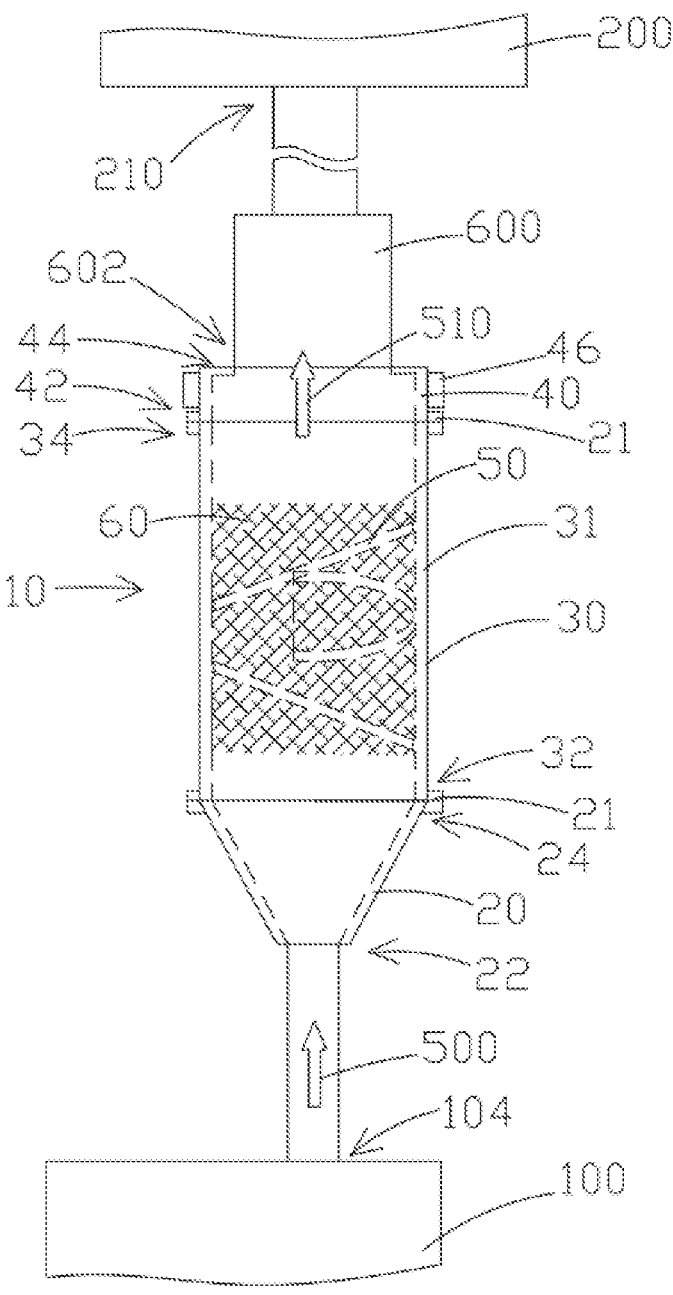
FIG. 12 is a schematic diagram illustrating the semiconductor waste gas treatment system of the disclosure equipped with a combustion processor.

In addition, as shown in FIG. 12, the semiconductor waste gas treatment system of the disclosure could optionally comprise a combustion processor 600 disposed between the moisture-gas separator 10 and the air extraction device 200. The exhaust pipe 40 of the moisture-gas separator 10 is disposed longitudinally, and the exhaust port 44 of the exhaust pipe 40 is connected to an air inlet port 602 of the combustion processor 600. Wherein the scrubbed waste gas 500 discharged by the wet scrubber 100 is first separated into water mist and dust contained in the scrubbed waste gas 500 by the moisture-gas separator 10 to form the dry waste gas 510, and then the dry waste gas 510 is discharged to the combustion processor 600 for combustion treatment. Wherein since the combustion processor 600 is disposed in a low-pressure environment between the moisture-gas separator 10 and the air extraction device 200, the combustion processor 600 of the disclosure could be a low-pressure plasma processor to perform low-pressure plasma combustion treatment on the dry waste gas 510. Similarly, a type of the combustion processor 600 of the disclosure is not particularly limited, the combustion processor 600 could also be an atmospheric pressure plasma combustion processor or other feasible combustion processors. As long as combustion treatment could be performed on the dry waste gas 510, any type could be applied to the disclosure.

As shown in FIG. 12, the moisture-gas separator 10 could optionally have a heating belt 46, and the heating belt 46 is, for example, any pipe fitting that covers the exhaust pipe 40 and/or connects with the exhaust pipe 40. Another feature of the disclosure is to use the heating belt 46 to heat the exhaust pipe 40 of the moisture-gas separator 10 and/or any pipe fittings connected to the exhaust pipe 40, thereby preventing excessive temperature difference between the pipes and causing deposition and blockage of water mist or dust that may remain in the dry waste gas 510. The dry waste gas 510 discharged through the exhaust port 44 of the exhaust pipe 40 could also be heated to make it drier, which is helpful for subsequent waste gas treatment. In other words, the heating belt 46 of the disclosure could be any heating component capable of increasing a temperature of the dry waste gas 510 discharged from the moisture-gas separator 10, the exhaust pipe 40 or any pipe fitting connected to the exhaust pipe 40. The heating belt 46 is, for example, but not limited to, a covering structure with heating wires and/or thermal insulation cotton. Any pipe fitting connected to the exhaust pipe 40 is, for example, communicated to the exhaust port 44 of the exhaust pipe 40, the air inlet port 602 of the combustion processor 600, or a pipeline communicated to a central waste gas treatment system. For example, if the semiconductor waste gas treatment system of the disclosure optionally comprises the combustion processor 600, the heating belt 46 is capable of heating the exhaust pipe 40 of the moisture-gas separator 10 and pipe fittings connected between the exhaust pipe 40 and the combustion processor 600 to avoid clogging of the air inlet port 602 of the combustion processor 600.

Figure 13:
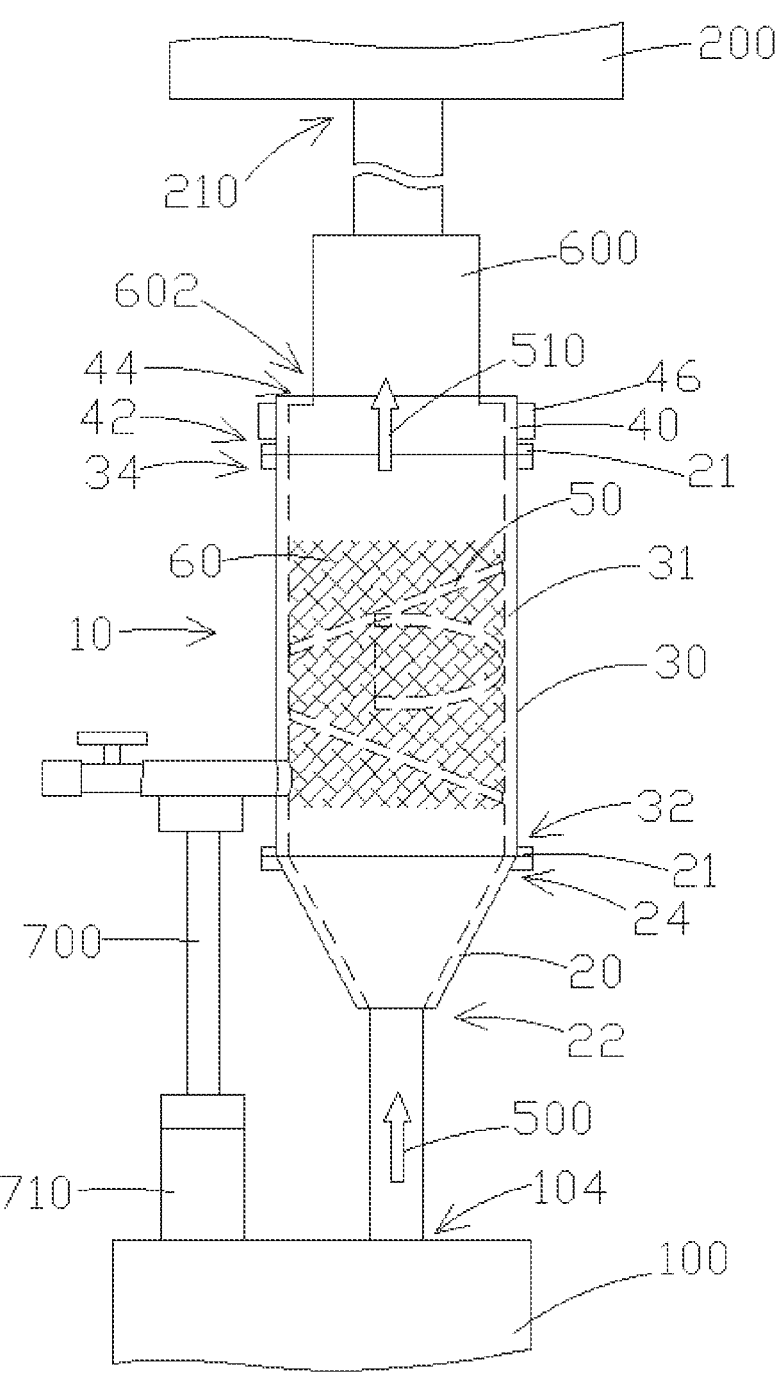
FIG. 13 is a schematic diagram illustrating a pressure relief bypass pipe with a safety pressure relief valve equipped between the separation pipe of the moisture-gas separator and the wet scrubber of the disclosure.

In addition, a pressure relief bypass pipe 700 with a safety pressure relief valve 710 could further be optionally connected between the separation pipe 30 of the moisture-gas separator 10 and the wet scrubber 100 of the disclosure. As shown in FIG. 13, the pressure relief bypass pipe 700 is connected to any suitable position on the pipe wall 31 of the separation pipe 30, such as upper half, central part or lower half, and the above-mentioned suitable position could also correspond to the diversion inclined partition 50 or the filter material layer 60 at different heights, for example. The safety pressure relief valve 710 is activated when an exhaust pressure of the scrubbed waste gas 500 discharged by the wet scrubber 100 exceeds a critical value (preset value). Therefore, with this safety and explosion-proof design, even if the process waste gas source 300 suddenly discharges a large amount of the process waste gas 400, or the moisture-gas separator 10 captures excessive dust and becomes clogged, or a filtration effect is reduced, it will not cause a blockage between the wet scrubber 100 and the air extraction device 200, so gas explosion or other problems could be avoided.

Based on the above, the semiconductor waste gas treatment system and the moisture-gas separator of the same of the disclosure have the following advantages:

(1) The moisture-gas separator performs a separation and filtration process outside the tank of the wet scrubber. Therefore, it is not limited to only capable of performing the separation and filtration process inside the tank of the wet scrubber, and a gas-liquid separation component installed inside the tank of the wet scrubber could be omitted.

(2) The moisture-gas separator is not only capable of maintaining separation and filtration efficacies of water mist and dust, but is further capable of providing transparent visualization, detachable and heatable designs, thereby achieving improvement effects of observation of pressure changes, quick replacement and extended maintenance cycle.

(3) The diversion inclined partition of the moisture-gas separator is disposed obliquely in the separation pipe instead of disposed horizontally. Therefore, effects of water mist separation and air flow guidance could be provided at the same time, so water mist could be separated and air conduction could be prevented from being affected.

(4) A heating belt could heat pipe fittings and the dry waste gas discharged from the moisture-gas separator to prevent clogging caused by water mist or dust residue.

Note that the specification relating to the above embodiments should be construed as exemplary rather than as limitative of the present disclosure, with many variations and modifications being readily attainable by a person of average skill in the art without departing from the spirit or scope thereof as defined by the appended claims and their legal equivalents.

What is claimed is:

1. A moisture-gas separator applicable for longitudinal communication between a wet scrubber and an air extraction device, the moisture-gas separator at least comprising:

an air inlet pipe, a separation pipe and an exhaust pipe, the separation pipe being disposed longitudinally to communicate between the air inlet pipe and the exhaust pipe, wherein the air inlet pipe is disposed longitudinally to communicate with an exhaust port of the wet scrubber, and the exhaust pipe is disposed longitudinally to communicate with an air extraction port of the air extraction device;

at least one diversion inclined partition, the at least one diversion inclined partition being obliquely disposed in the separation pipe; and at least one filter material layer filled in the separation pipe and located on the at least one diversion inclined partition to form a plurality of filtration sections, wherein the wet scrubber washes a process waste gas discharged from a process waste gas source and discharges a scrubbed waste gas, the air extraction device provides a suction force so that the scrubbed waste gas discharged by the wet scrubber first enters the separation pipe through the air inlet pipe, and is separated into water mist and dust contained in the scrubbed waste gas through the filter material layer and the at least one diversion inclined partition in the separation pipe such that the scrubbed waste gas becomes a dry waste gas, and then the dry waste gas is discharged through the exhaust pipe.

2. The moisture-gas separator as claimed in claim 1, wherein a diameter of the separation pipe is larger than a diameter of an air inlet port of the air inlet pipe.

3. The moisture-gas separator as claimed in claim 1, wherein the at least one diversion inclined partition is detachably disposed on a pipe wall of the separation pipe.

4. The moisture-gas separator as claimed in claim 3, wherein the separation pipe has at least one through groove obliquely distributed along a surface of the pipe wall, and the at least one diversion inclined partition is airtightly inserted into the through groove.

5. The moisture-gas separator as claimed in claim 1, wherein a projection area of the at least one diversion inclined partition partially or entirely overlaps an air inlet port of the separation pipe.

6. The moisture-gas separator as claimed in claim 1, wherein a pressure relief bypass pipe with a safety pressure relief valve is further connected between the separation pipe of the moisture-gas separator and the wet scrubber.

7. The moisture-gas separator as claimed in claim 1, wherein a combustion processor is further disposed between the moisture-gas separator and the air extraction device, the exhaust pipe is disposed longitudinally, and an exhaust port of the exhaust pipe is connected to an air inlet port of the combustion processor, wherein the scrubbed waste gas discharged by the wet scrubber is first separated into water mist and dust contained in the scrubbed waste gas by the moisture-gas separator to form the dry waste gas, and then the dry waste gas is discharged to the combustion processor for combustion treatment.

8. The moisture-gas separator as claimed in claim 1, wherein the exhaust pipe is further covered with a heating belt for heating the dry waste gas discharged through the exhaust port of the exhaust pipe.

9. The moisture-gas separator as claimed in claim 7, wherein an air inlet port of the air inlet pipe is detachably connected to the exhaust port of the wet scrubber, and the exhaust port of the exhaust pipe is detachably connected to the air inlet port of the combustion processor.

10. The moisture-gas separator as claimed in claim 1, wherein the separation pipe is detachably connected between the air inlet pipe and the exhaust pipe.

11. The moisture-gas separator as claimed in claim 1, wherein a quantity of the at least one diversion inclined partition is more than one, and the diversion inclined partitions are respectively disposed obliquely in the separation pipe and are staggeredly distributed inside an interior of the separation pipe in layers.

12. The moisture-gas separator as claimed in claim 11, wherein projection areas of the diversion inclined partitions partially overlap with an air inlet port of the separation pipe respectively, and jointly entirely overlap with the air inlet port of the separation pipe.

13. The moisture-gas separator as claimed in claim 1, wherein the separation pipe, the at least one diversion inclined partition and the filter material layer in the separation pipe are rotatably disposed between the air inlet pipe and the exhaust pipe.

14. The moisture-gas separator as claimed in claim 13, further comprising an outer sleeve, two ends of the outer sleeve being airtightly connected to the air inlet pipe and the exhaust pipe respectively, and the separation pipe being rotatably located in an interior of the outer sleeve.

15. The moisture-gas separator as claimed in claim 13, wherein the separation pipe is rotated by the scrubbed waste gas discharged from the wet scrubber.

16. The moisture-gas separator as claimed in claim 1, wherein the separation pipe is a hollow cylinder or a polygonal cylinder, and the diversion inclined partition is an are plate, a polygonal plate or a spiral plate.

17. The moisture-gas separator as claimed in claim 1, wherein the at least one diversion inclined partition has a plurality of ventilation holes that penetrate an upper surface and a lower surface of the at least one diversion inclined partition longitudinally or obliquely.

18. The moisture-gas separator as claimed in claim 1, wherein the separation pipe is made of a transparent material.

19. The moisture-gas separator as claimed in claim 1, wherein the filter material layer is a filter structure composed of at least one plastic strip staggered and stacked.

20. The moisture-gas separator as claimed in claim 1, wherein the filter material layer is an erosion-resistant filter material that is resistant to acid, alkali, oil and gas, or organic solvents.

21. The moisture-gas separator as claimed in claim 1, wherein the air inlet pipe, the separation pipe and the exhaust pipe are chlorinated polyvinyl chloride (CPVC) pipes.

22. A semiconductor waste gas treatment system used to treat a process waste gas discharged by a process waste gas source, at least comprising:

a wet scrubber, the wet scrubber washing the process waste gas and discharging a scrubbed waste gas;

the moisture-gas separator as claimed in claim 1 disposed externally on a tank of the wet scrubber; and an air extraction device, wherein the moisture-gas separator is communicated between the wet scrubber and the air extraction device, the air extraction device provides a suction force so that the scrubbed waste gas discharged by the wet scrubber is first separated into water mist and dust contained in the scrubbed waste gas by the moisture-gas separator to form a dry waste gas, and then the dry waste gas is discharged.

23. The semiconductor waste gas treatment system as claimed in claim 22, wherein the wet scrubber uses a negative pressure jet pipe to eject a washing liquid at high speed, thereby creating a low-pressure environment that inhales the process waste gas discharged from the process waste gas source, and the process waste gas is cut into microbubbles by using the washing liquid ejected at high-speed, thereby capturing and absorbing the microbubbles and dust the microbubbles carry, the suction force provided by the air extraction device causes the wet scrubber to discharge the scrubbed waste gas, so the scrubbed waste gas enters the moisture-gas separator communicated to the wet scrubber in order to carry out a separation and filtration process to cause the scrubbed waste gas to form the dry waste gas.

* * * * *